United States Patent [19]

Chau

[11] Patent Number: 5,447,660
[45] Date of Patent: Sep. 5, 1995

[54] METHOD FOR MAKING A CALCIUM HALOPHOSPHATE PHOSPHOR

[75] Inventor: Chung N. Chau, Sayne, Pa.

[73] Assignee: Osram Sylvania Inc., Danvers, Mass.

[21] Appl. No.: 162,830

[22] Filed: Dec. 6, 1993

[51] Int. Cl.⁶ .................................... C09K 11/73
[52] U.S. Cl. ..................... 252/301.4 P; 232/301.4 H
[58] Field of Search .............. 252/301.4 P, 301.4 H

[56] References Cited

U.S. PATENT DOCUMENTS

| | | | |
|---|---|---|---|
| 3,099,627 | 7/1963 | Mooney et al. | 252/301.4 P |
| 3,549,553 | 12/1970 | Wachtel | 252/301.4 P |
| 3,940,343 | 2/1976 | Demarest et al. | 252/301.4 P |
| 4,897,217 | 1/1990 | Jackson et al. | 252/301.4 P |
| 5,268,124 | 12/1993 | Chau | 252/301.4 P |
| 5,336,437 | 8/1994 | McSweeney | 252/301.4 P |

*Primary Examiner*—Mark L. Bell
*Assistant Examiner*—C. M. Bonner
*Attorney, Agent, or Firm*—Robert F. Clark

[57] ABSTRACT

The method of this invention provides calcium halophosphate phosphors activated with antimony and manganese having higher quantum efficiencies at specific antimony concentrations. The higher quantum efficiencies are obtained as a result of increasing the phosphor's UV reflectivity by decreasing the phosphor's particle size without substantially decreasing the phosphor's emission.

6 Claims, 3 Drawing Sheets

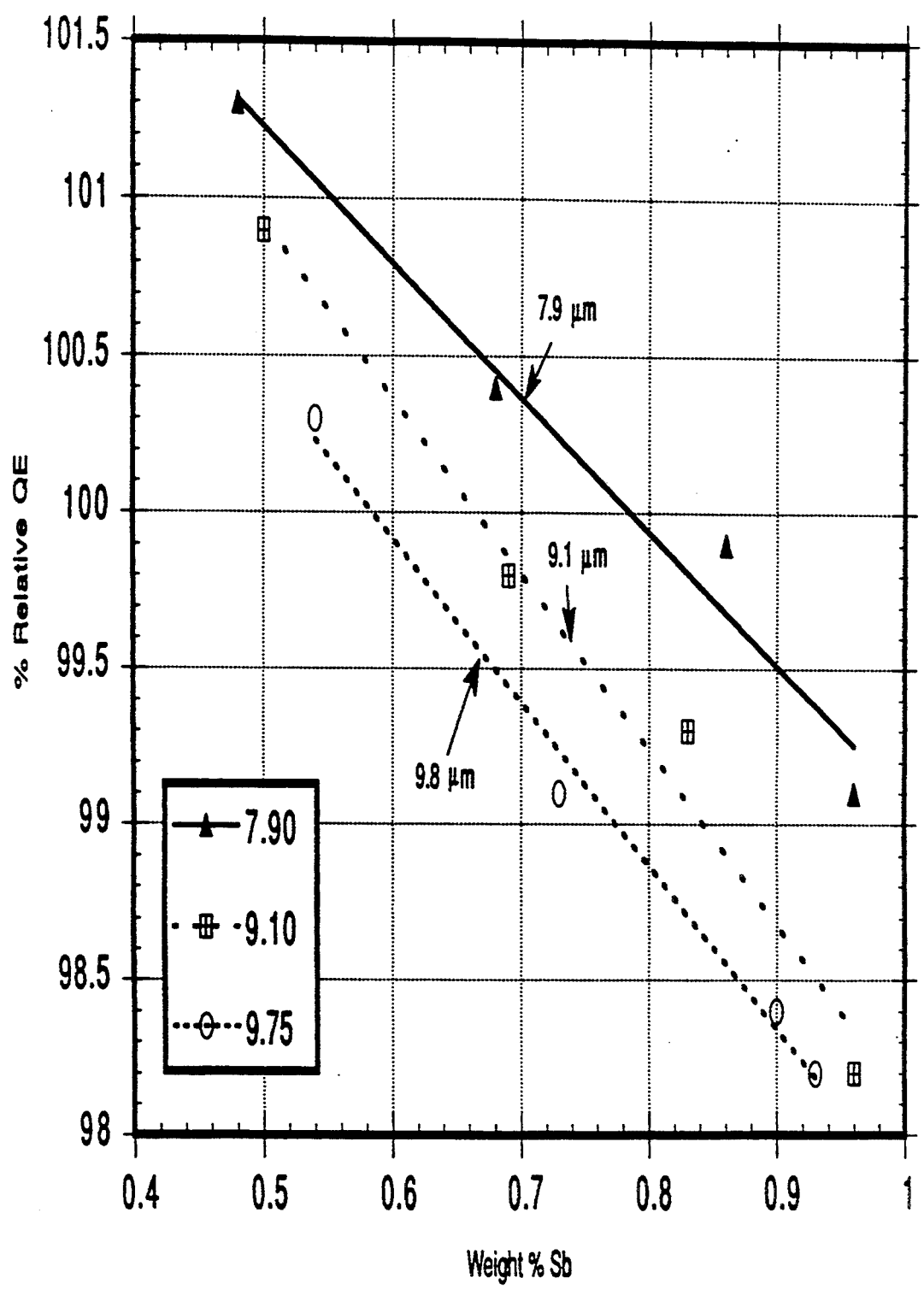
Fig. 1 Variation of Relative QE with Antimony at Different Cool White Size

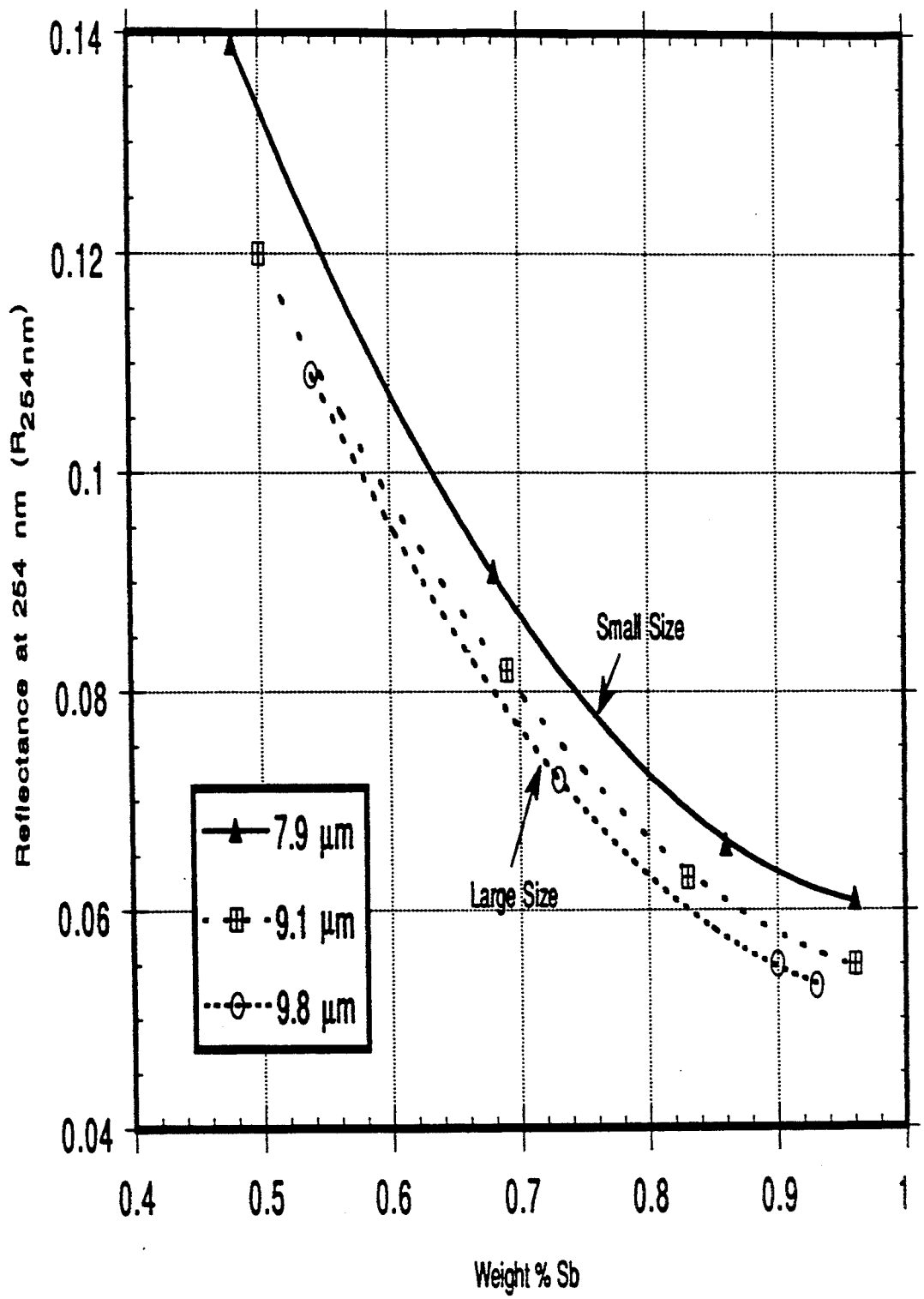
Fig. 2  Variation of UV Reflectance with Antimony at Different Cool White Size

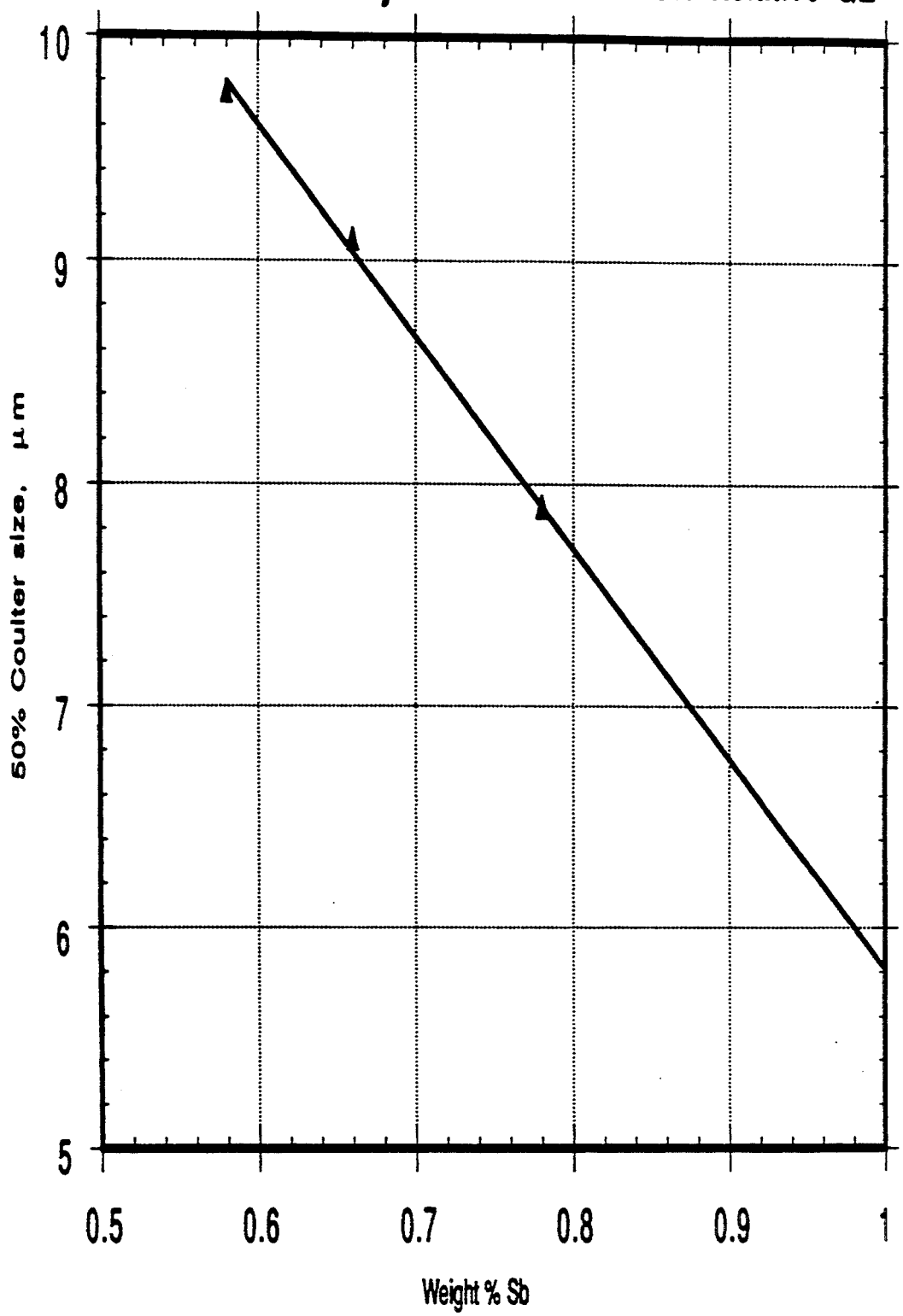

METHOD FOR MAKING A CALCIUM HALOPHOSPHATE PHOSPHOR

TECHNICAL FIELD

This invention relates to fluorescent lamp phosphors. More, particularly, it relates to methods for producing calcium halophosphate phosphors having manganese and antimony activators.

BACKGROUND ART

Calcium halophosphate phosphors have had wide application as fluorescent lamp phosphors. These phosphors are typically activated with antimony and manganese and may be adjusted in composition to provide white light, upon excitation by ultraviolet radiation, which varies from "cool" to "warm" white. Typical phosphors are "Cool White", Sylvania ™ type 4450 and "Warm White", Sylvania ™ type 4300. It is known in the art that the quantum efficiency of these phosphors can be affected by increasing the concentration of the antimony activator. For example, U.S. printed patent application B 288,018, issued to Wanmaker et al., describes a method of manufacturing halophosphate phosphors having higher antimony concentrations by contacting the reaction mixture with gaseous antimony trioxide generated from various antimonates. Other methods for making these types of phosphors are disclosed in U.S. Pat. Nos. 2,965,786, 3,379,649, 3,798,479, 3,255,373, and 5,232,626.

The present invention is an improvement over the prior art because it provides calcium halophosphate phosphors having higher quantum efficiencies at specific antimony concentrations by reducing the phosphor's particle size. Thus, the quantum efficiencies of calcium halophosphate phosphors may be increased without having to increase the levels of the antimony activator.

Generally, phosphors in fluorescent lamp applications convert the ultraviolet light emitted by the mercury discharge into visible light. For example, if an ultraviolet (UV) photon of 2540 Å is absorbed by the phosphor, then the phosphor might emit a lower energy photon of 5000 Å. The specific energy processes involved will depend on the exact composition of the phosphor.

Absorption of energy by a phosphor may occur in the host lattice or directly in the activator site. The activator site absorbs energy and changes its electronic state from a ground state to an excited state. Although several excited states are generally possible, only the lowest energy excited state is involved in photon emission. The proper choice of host and activator is essential to obtain an efficient phosphor. During excitation of the phosphor, some of the incident photons are reflected, some are transmitted, and, if the phosphor is an efficient combination of host and activator, most are absorbed. However, not all of the absorbed photons, or quanta, result in excitation of the activator, nor do all of the excited activator sites result in the emission of a photon. Some of the centers become deactivated by radiationless transitions.

In general, the energy (E) dissipation process in a phosphor can be represented as:

$$E_{absorbed} = E_{original} - E_{reflected}$$

$$E_{excitation} = E_{absorbed} - E_{lattice\ absorption}$$

The total energy balance can be expressed as:

$$E_{original} = E_{emission} + E_{excitation} + E_{lattice\ absorption} + E_{reflected}$$

where $E_{original}$ is the total incident energy on the phosphor.

The quantum efficiency (QE) of a phosphor can be expressed as:

$$QE = \frac{\text{Photons Emitted}}{\text{Photons Absorbed}}$$

$$QE = \frac{E_{emission}}{E_{original} - E_{reflected}}$$

While little can be done to change the excitation energy, $E_{excitation}$, and the host lattice absorption, $E_{lattice\ absorption}$, because they are intrinsic to the phosphor composition, the energy reflected, $E_{reflected}$, can be altered by changing the morphology of the material. For an efficient phosphor at its maximum $E_{emission}$, (emitted energy), an increase in $E_{reflected}$ will only lead to a small change in $E_{emission}$. If the decrease in $E_{emission}$ is smaller than the increase in $E_{reflected}$, an increase in QE will be observed yielding a more efficient phosphor.

SUMMARY OF THE INVENTION

This invention deals with improving the quantum efficiency of a calcium chlorofluorophosphate phosphor activated by antimony and manganese having the general chemical formula, $Ca_{5-x-y}Sb_xMn_y(PO_4)_3Cl_zF_{1-z}$, where x is from about 0.02 to 0.04, y is from about 0.1 to 0.2, and z is from about 0.07 to 0.11. In particular, the object of this invention is to provide a method for making calcium halophosphate phosphors having higher quantum efficiencies at specific antimony activator levels by reducing the particle size.

It is another object of this invention to provide calcium halophosphate phosphors having an optimum combination of particle size and antimony activator concentration for use in fluorescent lamp applications.

It is a further object of this invention to maximize the lumen output of fluorescent lamps made with calcium halophosphate phosphors.

BRIEF DESCRIPTION OF THE DRAWINGS

FIG. 1 graphically illustrates the relationship between the percent relative quantum efficiency of Cool White phosphors and weight percent of the antimony activator in the phosphors at various particle sizes.

FIG. 2 graphically illustrates the relationship between the UV reflectance of Cool White phosphors at 254 nm ($R_{254}$ nm) and the weight percent of the antimony activator in phosphors at various particle sizes.

FIG. 3 graphically illustrates the relationship between the particle size of Cool White phosphors and the weight percent of the antimony activator in the phosphors at a constant 100% relative QE.

BEST MODE FOR CARRYING OUT THE INVENTION

Higher efficiency calcium halophosphate phosphors can be obtained with a smaller size phosphor having between 0.5 and 1.0 weight percent antimony. For Cool White phosphors, this is possible because the phosphor's emission decreases only by up to 1.5% when lowering the phosphor size by about 19%. The smaller particle size causes an increase in the phosphor's UV reflectance at 254 nm of about 17%. Thus, because there has been only a small decrease in the phosphor's emission and a large increase in its reflectivity, the result is a phosphor having a higher quantum efficiency. Higher quantum efficiencies are similarly obtained for Warm White phosphors at smaller particle sizes.

FIG. 1 shows that by reducing the particle size of Cool White phosphors having a specific antimony concentration the quantum efficiency of the halophosphate phosphor is increased. This is because the smaller particle size increases the UV reflectivity of the phosphor. FIG. 2 shows the increased UV reflectivity at smaller particles sizes for Cool White phosphors having a fixed antimony concentration. Tables 1–4 show the changes in UV reflectivity at 254 nm, $R_{254nm}$, and quantum efficiency, QE, for several Cool White phosphor samples having varying particle sizes, as determined by Coulter Counter, and antimony activator concentrations. The QE for each phosphor sample is expressed as percent relative quantum efficiency, % relative QE. The phosphor standard used to determine the % relative QE was a standard Sylvania ™ type 4450 Cool White phosphor having an antimony concentration of about 0.65 percent by weight and an average particle size of about 10.5 microns. The tables also give the percent relative lumen plaque brightness relative to the standard Cool White phosphor and the 100 hour lumen output of a standard 40 watt fluorescent lamp, F40T12, made with the phosphor sample, including the coating weight for each lamp. Table 5 gives the same data for several Warm White phosphors.

TABLE 1

Change in $R_{254\ nm}$ and QE for Cool White phosphors at about 0.5 wt. % Sb for various phosphor sizes.

| 50% Coulter Counter (μm) | Weight % of Antimony | % Relative Lumen Plaque Brightness | $R_{254\ nm}$ | % Relative QE | F40T12 100 hour Lumens (Coating Wt., grams) |
|---|---|---|---|---|---|
| 7.80 | 0.48 | 94.8 | 0.139 | 101.3 | 2887 (5.1) |
| 8.92 | 0.50 | 96.5 | 0.120 | 100.9 | 2912 (4.5) |
| 9.55 | 0.54 | 97.1 | 0.109 | 100.3 | 2943 (4.6) |

TABLE 2

Change in $R_{254\ nm}$ and QE for Cool White phosphors at about 0.7 wt. % Sb for various phosphor sizes.

| 50% Coulter Counter (μm) | Weight % of Antimony | % Relative Lumen Plaque Brightness | $R_{254\ nm}$ | % Relative QE | F40T12 100 hour Lumens (Coating Wt., grams) |
|---|---|---|---|---|---|
| 8.05 | 0.68 | 99.2 | 0.091 | 100.4 | 3005 (5.0) |
| 8.94 | 0.69 | 99.6 | 0.082 | 99.8 | 2990 (4.7) |
| 9.69 | 0.73 | 100.0 | 0.072 | 99.1 | 2988 (4.7) |

TABLE 3

Change in $R_{254\ nm}$ and QE for Cool White phosphors at about 0.85 wt. % Sb for various phosphor sizes.

| 50% Coulter Counter (μm) | Weight % of Antimony | % Relative Lumen Plaque Brightness | $R_{254\ nm}$ | % Relative QE | F40T12 100 hour Lumens (Coating Wt., grams) |
|---|---|---|---|---|---|
| 8.03 | 0.86 | 101.4 | 0.066 | 100.0 | 3052 (4.9) |
| 9.26 | 0.83 | 101.1 | 0.063 | 99.3 | 3006 (4.6) |
| 10.11 | 0.90 | 101.1 | 0.055 | 98.4 | 3010 (4.7) |

TABLE 4

Change in $R_{254\ nm}$ and QE for Cool White phosphors at about 0.95 wt. % Sb for various phosphor sizes.

| 50% Coulter Counter (μm) | Weight % of Antimony | % Relative Lumen Plaque Brightness | $R_{254\ nm}$ | % Relative QE | F40T12 100 hour Lumens (Coating Wt., grams) |
|---|---|---|---|---|---|
| 7.87 | 0.96 | 101.1 | 0.061 | 99.1 | 3018 (4.5) |
| 9.27 | 0.96 | 100.9 | 0.055 | 98.2 | 3016 (4.5) |
| 9.70 | 0.93 | 101.1 | 0.053 | 98.2 | 3001 (4.7) |

TABLE 5

Change in $R_{254\,nm}$ and QE for Warm White phosphors at various wt. % Sb and phosphor sizes.

| 50% Coulter Counter (μm) | Weight % of Antimony | % Relative Lumen Plaque Brightness | $R_{254\,nm}$ | % Relative QE | F40T12 100 hour Lumens (Coating Wt., grams) |
| --- | --- | --- | --- | --- | --- |
| 7.26 | 0.30 | 87.0 | 0.230 | 101.2 | 2844 (4.8) |
| 7.31 | 0.53 | 96.3 | 0.138 | 100.1 | 3076 (4.8) |
| 7.45 | 0.68 | 100.8 | 0.097 | 100.0 | 3164 (5.1) |
| 12.97 | 0.63 | 98.9 | 0.082 | 96.6 | 3052 (5.2) |
| 7.79 | 0.89 | 99.9 | 0.078 | 97.1 | 3098 (5.2) |

In all of the examples shown in Tables 1–5, it is clear that at a given antimony concentration, a smaller size halophosphate phosphor yielded a phosphor having a higher quantum efficiency. The examples also show that the highest relative quantum efficiency doesn't necessarily make a lamp having a higher lumen output. In fact, the lamps having a percent relative QE of about 100% yielded fluorescent lamps having the highest lumen output at 100 hours. Thus, the preferred embodiment is the combination of antimony content and particle size which yields a lamp having the highest lumen output. This appears to be the condition where the percent relative quantum efficiency is about 100%. For example, for a Cool White phosphor having 0.85 weight percent antimony the desired particle size would be 8 microns. FIG. 3 shows the relationship between antimony concentration and particle size at a constant 100% relative quantum efficiency.

By selecting the proper combination of the initial particle size of the dicalcium phosphate raw material and the firing temperature of the phosphor admixture, it is possible to produce a calcium halophosphate phosphor having a specific particle size. The relationship between the initial dicalcium phosphate particle size and the optimum firing temperature to yield a specific size phosphor is given in Table 6.

TABLE 6

Optimum firing temperatures for various size CaHPO₄ particle sizes.

| 50% Coulter Counter Size, CaHPO₄ (μm) | Typical 50% Coulter Counter Size of Phosphor (μm) | Optimum Firing Temperature (°C.) |
| --- | --- | --- |
| 6.50 | 7.2 | 1120 |
| 7.90 | 8.4 | 1135 |
| 9.00 | 9.4 | 1150 |
| 12 | 12.3 | 1155 |

EXAMPLES

The following non-limiting examples are provided:

Cool White phosphors having varying antimony content were prepared using the following procedure and admixtures.

TABLE 7

| Compound | No. of Moles | Batch Weight (grams) |
| --- | --- | --- |
| CaHPO₄ | 3.000 | 408.2 |
| CaCO₃ | 1.2812 | 128.1 |
| CaF₂ | 0.4463 | 35.2 |
| NH₄Cl | 0.1904 | 10.2 |
| MnCO₃ | 0.0934 | 11.6 |
| Sb₂O₃ | X (where X = 0.04, 0.06, 0.08, or 0.10) | (11.7, 17.5, 23.3, or 29.2) |

Admixtures of the raw materials were combined in the proportions given in Table 7. The admixtures were V-blended, fired under a nitrogen atmosphere at the optimum temperature suitable for the selected dicalcium phosphate size. The fired material was then broken up, washed in 5% hydrochloric acid and then 3% ammonium hydroxide, dried and sieved.

Warm White phosphors having varying antimony content were prepared using the following admixtures and process steps.

TABLE 8

| Compound | No. of Moles | Batch Weight (grams) |
| --- | --- | --- |
| CaHPO₄ | 3.000 | 408.2 |
| CaCO₃ | 1.2058 | 120.6 |
| CaF₂ | 0.4259 | 33.6 |
| NH₄Cl | 0.3296 | 17.6 |
| MnCO₃ | 0.1679 | 20.9 |
| Sb₂O₃ | X, (where X = 0.04, 0.06, 0.08, or 0.10) | (11.7, 17.5, 23.3, or 29.2) |

Admixtures of the raw materials were combined in the proportions given in Table 8. The admixtures were V-blended, fired at the optimum temperature suitable for the dicalcium phosphate size as listed in Table 6 under a nitrogen atmosphere. The fired material was then broken up, washed in 5% hydrochloric acid and then 3% ammonium hydroxide, dried and sieved.

I claim:

1. A method for making a calcium halophosphate phosphor activated with antimony and manganese, the phosphor having a weight percentage of antimony and a general formula, $Ca_{5-x-y}Sb_xMn_y(PO_4)_3Cl_zF_{1-x-z}$, where x is from about 0.02 to 0.04, y is from about 0.1 to 0.2, and z is from about 0.07 to 0.11, the method comprising the steps of:

a) combining a source of dicalcium phosphate, a source of calcium carbonate, a source of calcium fluoride, a source of ammonium chloride, a source of manganese carbonate, and a source of antimony oxide to form an admixture, the source of dicalcium phosphate having a particle size selected to yield a phosphor having a specific particle size when the admixture is fired, the specific particle size being determined by the weight percent of antimony so that the combination of the specific particle size and weight percent of antimony yield a 100 percent relative quantum efficiency relative to a cool white phosphor having about 0.65 weight percent antimony and a particle size of about 10.5 microns;

b) firing the admixture at a temperature to form the calcium halophosphate phosphor activated with antimony and manganese having the specific particle size.

2. The method of claim 1 wherein the weight percentage of antimony is from between about 0.5 to 1.0 percent by weight.

3. The method of claim 1 wherein the particle size of the dicalcium phosphate source is from between about 6.5 to about 12 microns and the temperature is from between about 1120° C. to about 1155° C.

4. The method of claim 1 wherein the admixture is fired in an inert atmosphere.

5. The method of claim 4 wherein the inert atmosphere is nitrogen.

6. The method of claim 1, wherein the weight percentage antimony is about 0.85 percent by weight and the calcium halophosphate phosphor particle size is about 8 microns.

* * * * *